(12) United States Patent
Dayton et al.

(10) Patent No.: US 8,042,789 B2
(45) Date of Patent: Oct. 25, 2011

(54) VALVE FOR DISTRIBUTING FLUIDS

(75) Inventors: Robert A. Dayton, Attica, MI (US); Anthony J. Mattord, Rochester Hills, MI (US)

(73) Assignee: Eaton Corporation, Cleveland, OH (US)

( * ) Notice: Subject to any disclaimer, the term of this patent is extended or adjusted under 35 U.S.C. 154(b) by 510 days.

(21) Appl. No.: 12/245,990

(22) Filed: Oct. 6, 2008

(65) Prior Publication Data

US 2010/0084590 A1    Apr. 8, 2010

(51) Int. Cl.
    *F16K 31/12* (2006.01)
(52) U.S. Cl. .............. 251/129.19; 251/129.15
(58) Field of Classification Search .......... 251/77, 251/129.15, 129.19
    See application file for complete search history.

(56) References Cited

U.S. PATENT DOCUMENTS

| | | | |
|---|---|---|---|
| 4,582,088 A | 4/1986 | Cook et al. | |
| 4,844,122 A * | 7/1989 | Ichihashi | 137/625.65 |
| 5,083,747 A | 1/1992 | Schmitt-Matzen | |
| 5,509,637 A | 4/1996 | Leonard | |
| 5,853,028 A * | 12/1998 | Ness et al. | 137/625.65 |
| 5,988,129 A | 11/1999 | Prior et al. | |
| 6,029,703 A | 2/2000 | Erickson et al. | |
| 6,209,563 B1 | 4/2001 | Seid et al. | |
| 6,237,719 B1 | 5/2001 | Fujii et al. | |
| 6,269,827 B1 * | 8/2001 | Potter | 137/14 |
| 6,321,767 B1 | 11/2001 | Seid et al. | |
| 6,736,240 B2 | 5/2004 | Dürr et al. | |
| 6,901,959 B2 * | 6/2005 | Burrola et al. | 137/625.65 |
| 6,988,590 B1 | 1/2006 | Knight | |
| 2005/0133098 A1 | 6/2005 | Ino et al. | |

FOREIGN PATENT DOCUMENTS

| | | |
|---|---|---|
| DE | 4221757 A1 | 1/1994 |
| EP | 0856857 A2 | 8/1998 |

OTHER PUBLICATIONS

International Search Report for S.N. PCT/IB2009/007053 dated Jan. 28, 2010 (14 pages).

* cited by examiner

*Primary Examiner* — John Fristoe, Jr.
(74) *Attorney, Agent, or Firm* — Dierker & Associates, P.C.

(57) ABSTRACT

A valve for distributing fluids includes a housing, a bobbin disposed within the housing having a bore, a coil disposed on the bobbin wall, and an armature disposed within the bore of the bobbin. The armature includes a point region and a main body that is integral to the point region. The armature moves between a first position and a second position. The solenoid valve further includes a pole piece having a cylindrical bore and a valve body disposed within the cylindrical bore of the pole piece. The solenoid valve also includes a spool disposed within the valve body bore, and a spring member operatively disposed within the spool bore.

16 Claims, 3 Drawing Sheets

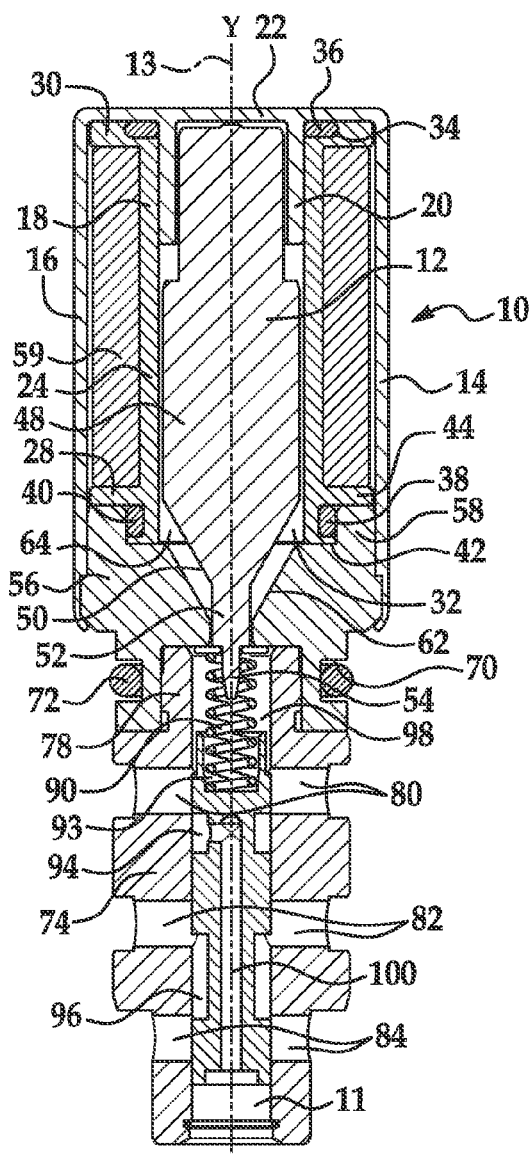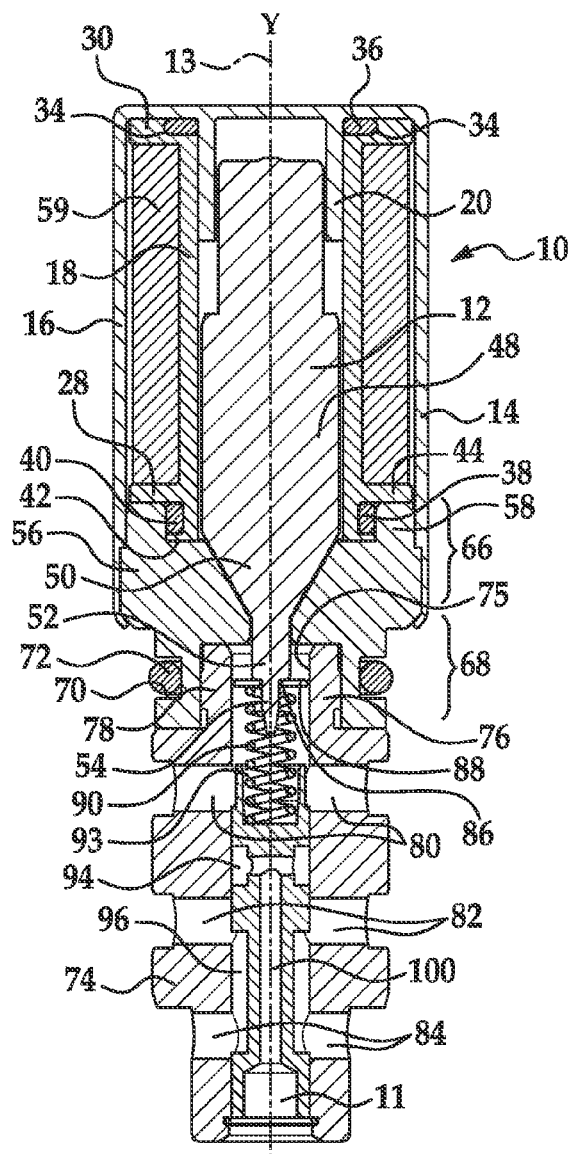

VALVE FOR DISTRIBUTING FLUIDS

BACKGROUND

The present disclosure relates generally to valves for distributing fluids.

A solenoid valve is a valve which is opened by a plunger whose movement is controlled by an electrically energized coil; the valve may be closed by the action of a spring, by gravity, or by an electrically energized coil. The task of a solenoid valve is to control fluid flow, e.g., by shutting off release, dosing, distributing or mixing fluids. Typical automobiles include numerous systems that use one or more solenoid valves to control the flow of fluid within the system and to control the flow of fluid between systems. Many of these solenoid valves are three port solenoid valves that require hydraulic fluid to be isolated or modulated between supply, control, and exhaust ports. These valves often define a pressure chamber having an input port connected to a pressure source and an output port or control port. To vary the degree of pressure within the chamber and hence the degree of pressure available to the output port, fluid is introduced at a pressure that is different from that established by the source.

In order to properly isolate or modulate the flow of the hydraulic fluid, the geometry around a supply-to-control (S/C) valve seat and the geometry around a control-to-exhaust (C/E) valve seat are generally customized as a function of the poppet travel. In most cases, especially linear pressure control solenoid valves, poppet alignment and/or the presence of a spring in the hydraulic flow path may result in significant, undesirable variation in the functional performance of the solenoid valve.

A typical three port solenoid valve uses a rod and ball configuration to control the flow of fluid between the ports. The rod can have an area that interfaces a first seat, and a port that extends to push a ball away from a second seat. Moreover, the ball may have a spring behind it that helps keep it seated or in contact with the rod. This type of configuration produces two annular orifices with a radially floating ball that may be undesirably sensitive to component alignment during manufacturing and usage of the valve. Moreover, the use of a spring in the hydraulic flow path may in some instances result in undesirable variation in the performance of the solenoid valve.

SUMMARY

A valve for distributing fluids according to embodiment(s) as disclosed herein includes a housing and a bobbin disposed within the housing. The bobbin has a bobbin wall defining a bore at a first surface thereof. A coil is operatively disposed on a second surface of the bobbin wall, the second surface being opposed to the first surface. An armature is disposed within the bobbin bore, the armature having a point region and a main body, wherein the main body is integral to the point region, the armature being moveable from a first position to a second position. A pole piece includes a cylindrical bore, and may include an upper pole piece and a lower pole piece. The upper pole piece is disposed within the housing, and at least a portion of the upper pole piece abuts the bobbin. A valve body is disposed within the cylindrical bore of the pole piece, the valve body having a valve body bore. A spool is disposed within the valve body bore, the spool having a spool bore, an annular exhaust cavity, and an annular supply-control cavity, the spool being moveable between a first position and a second position in the valve body bore. The valve further includes a spring member having a first spring end and an opposed second spring end, the first spring end being operatively disposed within the spool bore. The second spring end operatively receives the armature point region.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a cross sectional view of an embodiment showing the valve in a non-energized state;

FIG. 2 is a cross sectional view of an embodiment showing the valve unbalanced and in an energized state;

DETAILED DESCRIPTION

The present disclosure provides a relatively simple and cost effective spool valve and method for manufacturing the same, which delivers two discrete pressures of engine oil by energizing a magnetic circuit. The valve and method disclosed herein substantially and advantageously overcome at least the potential drawbacks noted in the background above.

As is known in the art, a roller follower and its mating parts include a valve, valve stem, roller follower, and cam lobe. An engine valve is generally mounted in a cylinder head for axial movement inside an engine valve guide (not shown) in the cylinder head. With the spring member, e.g., a compression spring, assembled in this fashion, the engine valve seating surface is biased against the cylinder head seat to close the engine valve port passage. The engine valve, having an elongated generally cylindrical body with an upper end and lower end, is positioned in the cylindrical body with the upper end and lower end positioned in the cylinder head in proximity to its engine valve stem. The engine valve system includes an internal reservoir chamber into which oil is delivered by the engine's lubricating system and more specifically, via an improved means as disclosed herein.

Figure 3:
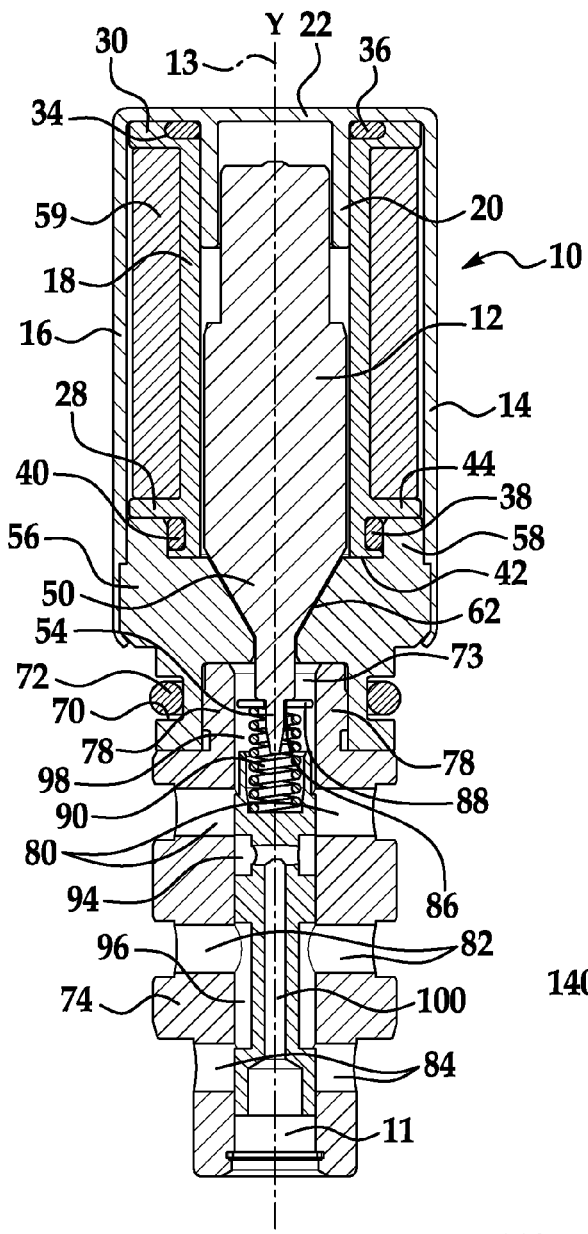
FIG. 3 is a cross-sectional view of an embodiment showing the valve balanced and in an energized state.

Referring now to FIGS. 1, 2 and 3 together, an embodiment of the three port solenoid valve is depicted generally at reference numeral 10. Solenoid valve 10 is shown wherein an armature 12, typically, but not necessarily, made of steel is implemented. The armature 12 is disposed along axis Y (also labeled as reference numeral 13) in housing 14. The housing 14 may be made of steel or like material. It is to be understood that the housing 14 may be a single unit as shown, or it may be a multiple piece unit using an end cap (not shown) that fits at one end of the cylindrical body wall. The single unit housing 14 includes cylindrical wall 16 integral to the housing 14 wherein an upper cylinder unit 20 is disposed within a bobbin 18 (fitted within the housing 14), and an end 22 of cylinder unit 20 abuts the armature 12.

Bobbin 18 as shown is a single molded member and may be formed from a glass filled polymer, nylon, like materials, or combinations thereof. Bobbin 18 includes a bobbin wall 24, an upper flange 30 and a lower flange 44. The bobbin wall 24 defines the bobbin bore 32 such that the bobbin 18 is also disposed along axis Y (reference numeral 13). The bobbin 18 may also include an annular shoulder 34 formed within the upper flange 30 to receive an O-ring 36; and a recess 38 (within the lower flange 28) which is also adapted to receive an O-ring 40 in order to secure the bobbin 18 within the valve 10. The lower flange 28 includes a first rib 42 and a second rib 44 which may be integral to bobbin wall 24 wherein the first rib 42 and the second rib 44 define a recess 38 which receives aforementioned O-ring 40.

The armature 12 may also be made of steel, and as indicated, armature 12 is disposed along axis Y (reference numeral 13) in housing 14. The armature 12 as shown in the embodiment of FIG. 1 may include a shoulder 46 integral to armature 12. Armature 12 includes the following components which are integral to armature 12: a main body 48, a frustoconical section 50, a head 52 and a point region 54. Frustoconical section 50 is adapted to interface with a pole piece 56 when armature 12 is energized by a coil 59 and moves along axis Y (reference numeral 13).

Pole piece 56 may be made of steel or other like material. Pole piece 56 includes pole piece rib 58 which abuts both the first rib 42 and the second rib 44 of the lower flange of bobbin 18. Pole piece rib 58 is also adjacent to O-ring 40 disposed within recess 38 of bobbin 18. Pole piece 56 further includes a pole piece frustoconical section 62 which operates in conjunction with the bore 32 of bobbin 18 to define armature cavity 64. Pole piece frustoconical section 62 is adapted to abut armature frustoconical section 62 when armature 12 is energized by coil 59 and displaced within the valve 10.

As shown in FIG. 1, this embodiment further implements coil 59 that is disposed between the housing 14 and the bobbin 18. The coil 59 is energized by a power source (not shown) and may be made of copper or similar material. The operation of the coil 59 relative to the other valve components will be discussed later.

The lower flange 28 of bobbin 18 is fitted against pole piece 56 within housing 14. As shown in FIG. 2, pole piece 56 includes an upper pole piece section 66 and a lower pole piece section 68 wherein the upper pole piece section 66 is disposed within the housing 14, and the lower pole piece section 68 extends outside of the housing. The lower pole piece section 68 includes an annular recess 70 which is adapted to receive O-ring 72 to allow valve to fit in valve assembly. Lower pole piece section 68 also includes a cylindrical cavity 76 which is adapted to receive a valve body 74 which is attached to the pole piece 56 through a press fit between the valve body 74 and the pole piece 56.

The valve body shown in FIGS. 1, 2 and 3 includes an upper annular ring 78 integral to valve body 74. Upper annular ring 78 as indicated is press fitted against the cylindrical cavity 76 of pole piece 56. Valve body 74 further includes a first opening 80 which operates as an exhaust port, a second opening 82 which operates as a supply port, and a third opening 84 which operates as a control port.

In an embodiment, as shown in FIG. 2, the point region 54 of armature 12 may be disposed within aperture 86 of spring plate 88. The point region 54 may further extend within a spring member 90, as shown in FIGS. 1, 2 and 3. Spring member 90 is disposed between spring plate 88 and spool 92. The spool 92 includes a first spool recess 94, a second spool recess 96, and a spool bore 100.

As used herein, "spring member" is meant to include any suitable resilient member, including but not limited to coil springs, wave springs, compression springs, extension springs, and/or other resilient members, and/or the like.

The compression of the spring member 90 (and hence bias force) is dependent on the press fit between the valve body 74 and the pole piece 56. The valve 10 may be calibrated through the press fit between the valve body 74 and the pole piece 56. Such calibration may also be accomplished by other suitable methods, non-limiting examples of which include adjustable threaded members, slide and stake devices, or the like, or combinations thereof. As the valve body 74 is further inserted into the pole piece 56, the volume of the spring cavity 98 is reduced, and the compression force on spring member 90 is increased. As the compression force on the spring member 90 increases, more pressure is required in the valve 10 between the control port 84 and supply port 82 to cause the valve 10 to balance out (after the coil 59 is energized) such that the spool 92 is displaced back from its initially energized position along Y-axis 13 so that the flow from supply port 82 to the control port 84 diminishes. In the "balanced position," the resulting force within the spool 92 is equivalent to the force exerted by the spring member 90 against the spool 92, as shown in FIG. 3.

In operation, the valve 10 in this embodiment may be energized by coil 59 to cause the armature 12 to move along Y-axis 13 until armature 12 engages with pole piece frustoconical section 62 and pushes the spring member 90 and spool 92 along Y-axis 13 (from a resting, first position, as shown in FIG. 1) to open flow from the supply port 82 towards the control port 84, as shown in FIG. 2. It is to be understood that the initially energized position (i.e. a transient position) as shown in FIG. 2 is where the energized coil 59 is causing the armature 12 to engage with pole piece 56, thereby compressing the spring member 90 at the armature head 52 and spring plate 88, which causes the spool 92 to be displaced so that flow between the supply port 82 and the control port 84 is open.

In an embodiment, the transient position of the spool 92, intermediate the first position and the second position of the spool 92, is a position at which an opening between the spool 92 and the control port 84 reaches a maximum predetermined height at which fluid flow between the supply port 82 and the control port 84 is unblocked.

It is to be understood that the range of opening (i.e. maximum predetermined height) between control port 84 and spool 92 depends on the hydraulic flow required by the downstream system. The spool 92 is initially moved by the solenoid assembly to a transient position. However, the spool 92 does not stay in this transient position, rather it will quickly resettle at a different position (i.e. the second position), depending at least in part on the back-pressure created in the downstream (from the control port 84) system soon thereafter. Since the valve 10 of the present disclosure is a pressure regulator, it balances its spool 92 location in response to pressure. Hydraulic flow is a by-product of the pressure and could be any suitable value depending on downstream needs.

As such, it is to be further understood that suitable values for the maximum predetermined height vary from one application/end use to another, depending at least in part on parameters such as the diameter of the spool 92, the downstream volume, the required response time for deactivation, strength of the solenoid, and/or the like.

In one non-limiting example, the maximum predetermined height may range from about 0 mm to about 3 mm of spool 92 stroke.

When the pressure in the cavity between the supply port 82 and the control port 84 meets a predetermined threshold (where the pressure between the supply port and the control port overcomes the force exerted by the spring member), the spool 92 will "balance" to a second position such the spool 92 is again displaced along the Y-Axis 13 toward housing 14 so as to overcome the force of the spring member 90 until the pressure in the cavity between the supply port 82 and the control port 84 is reduced such that it is equivalent to the force exerted by the spring member 90.

Figure 4:
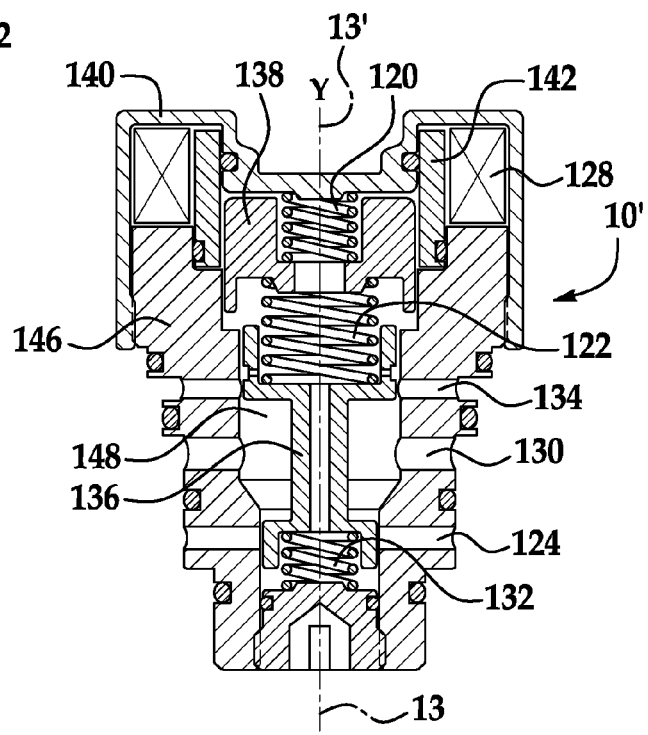
FIG. 4 is a cross-sectional view of a second embodiment of the solenoid valve of the present disclosure.

In another embodiment, a three port solenoid valve 10' is shown in FIG. 4. This embodiment implements a release spring member 120, a high pressure spring member 122, and a low pressure spring member 124, as well as an unbalanced spool 126. When the coil 128 is not energized and pressure is low, fluid flows out of the supply port 124 to the control port 130. As fluid flow increases, the valve 10' balances itself so that the spool 136 is displaced along the Y-axis 13' to open up the exhaust port 134 and allow for fluid to flow through the exhaust port 134 when the fluid pressure from the supply port 130 to the control port 132 reaches a predetermined threshold.

In order to deliver an increased pressure of fluid, the coil 128 is energized, which moves armature 138 along Y-axis 13' to overcome force exerted by release spring member 120. This causes the exhaust port 136 to open, thereby resulting in reduced fluid pressure delivered at control port 130.

In this embodiment, a housing 140 is also implemented which contains the coil 128 for energizing the valve 10'. The coil 128 is disposed about a tube 142 (which may be made of aluminum or other suitable materials), and the armature 138 is further disposed within tube 142. Similar to the previous embodiment, a valve body 146 is implemented which further defines a valve body bore 148 which is adapted to receive spool 136 as shown. O-rings are implemented to seal the solenoid valve in its position, as well as to secure tube 142 in place within the valve 10'.

Figure 5:
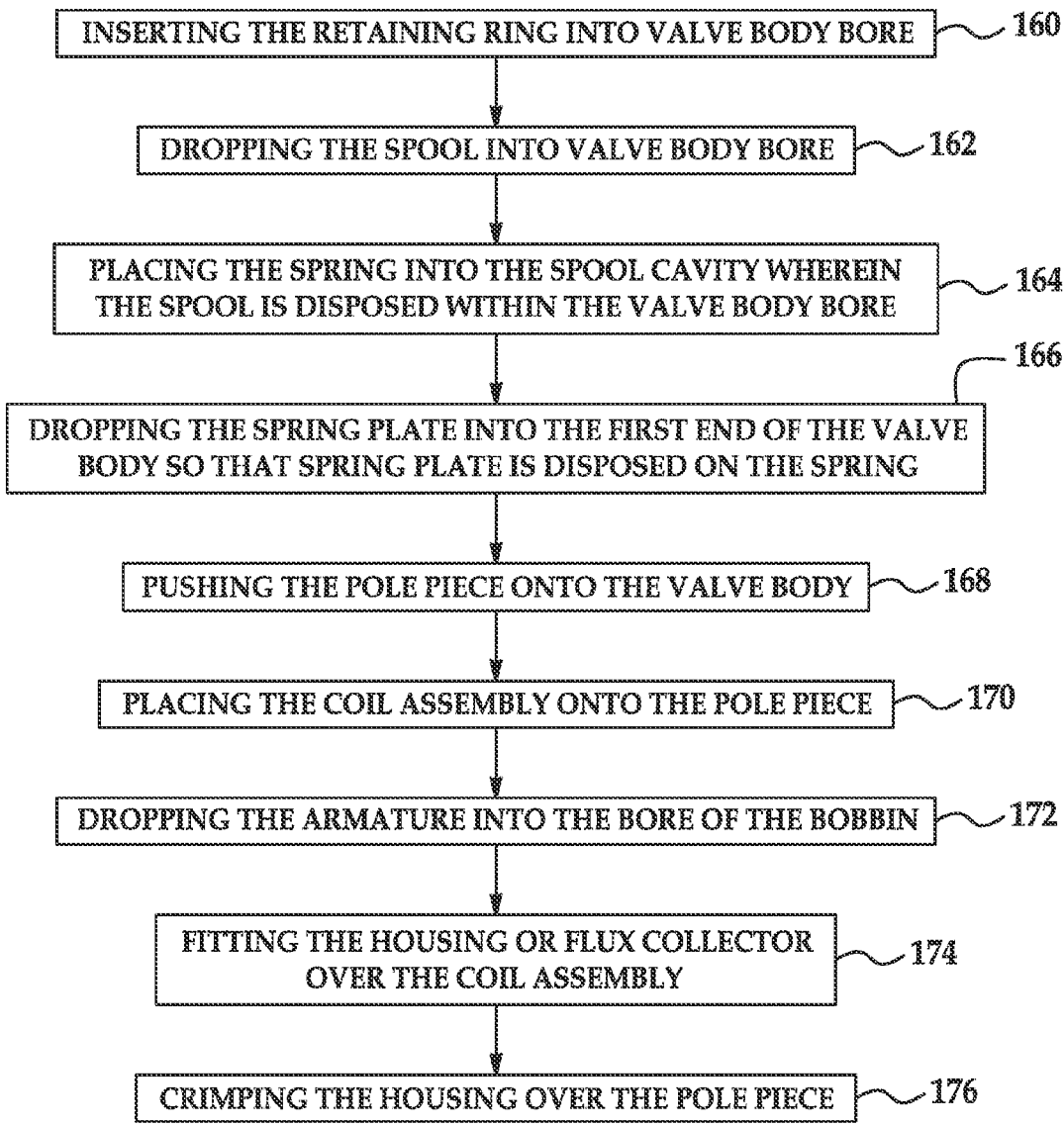
FIG. 5 is a flow diagram which illustrates an example of a method of manufacturing embodiments of the solenoid valve of the present disclosure.

This disclosure further provides improved manufacturability of this component wherein improved accuracy in alignment of components is achieved. This advantage is gained, due at least in part, to the ease of assembling the armature 12 to the spring member 90 through the use of the armature point region 54 and spring plate aperture 86, 88 (shown in FIG. 2). Referring now to FIG. 5 together with FIG. 1, the first step in the manufacturing process includes inserting the retaining ring 11 into valve body 74, as depicted at reference numeral 160. The second step is dropping/inserting the spool 92 into valve body 74, as depicted at reference numeral 162. It is to be understood that, as used herein, the term "dropping" is not intended to connote any specific directional orientation (though in some embodiments, it is contemplated as being within the purview of the present disclosure to advantageously utilize the effects of gravity and "drop" in a substantially downward direction), but rather is intended to connote inserting one component into/onto another via any suitable means. The third step is placing the spring member 90 into the spool bore 93 wherein the spool 92 is disposed within the valve body bore 75, as depicted at reference numeral 164. The fourth step is dropping/inserting the spring plate 88 into the first end 73 (shown in FIG. 3) of the valve body 74, as depicted at reference numeral 166. The fifth step is pushing the pole piece 56 onto the valve body 74, as depicted at reference numeral 168. The sixth step is placing the coil assembly onto the pole piece 56, as depicted at reference numeral 170. It is to be understood that the coil assembly includes the bobbin 18 and coil 59. The seventh step is dropping/inserting the armature 12 into the bore 32 of the bobbin 18, as depicted at reference numeral 172. The eighth step is fitting the housing 14 or flux collector over the coil assembly, as depicted at reference numeral 174. The ninth step is joining the housing 13 to the pole piece 56, a non-limiting example of which is by crimping housing 13 over pole piece 56, as depicted at reference numeral 176. It is to be understood that any suitable joining method may be used, including but not limited to crimping, welding, threading, adhering, press-fitting, mechanical interlocking, or the like. While multiple embodiments have been described in detail, it will be apparent to those skilled in the art that the disclosed embodiments may be modified. Therefore, the foregoing description is to be considered exemplary rather than limiting.

What is claimed is:

1. A valve for distributing fluids, the valve comprising:
   a housing;
   a bobbin disposed within the housing, the bobbin having a bobbin wall defining a bore at a first surface thereof;
   a coil operatively disposed on a second surface of the bobbin wall, the second surface being opposed to the first surface;
   an armature disposed within the bobbin bore, the armature having a point region and a main body, wherein the main body is integral to the point region, the armature being moveable from a first position to a second position;
   a pole piece including a cylindrical bore, an upper pole piece and a lower pole piece, wherein the upper pole piece is disposed within the housing and at least a portion of the upper pole piece abuts the bobbin;
   a valve body disposed within the cylindrical bore of the pole piece, the valve body having a valve body bore;
   a spool disposed within the valve body bore, the spool having a spool bore, an annular exhaust cavity, and an annular supply-control cavity, the spool being moveable between a first position and a second position in the valve body bore; and
   a spring member having a first spring end and an opposed second spring end, the first spring end operatively disposed within the spool bore, the second spring end operatively receiving the armature point region.

2. The valve as defined in claim 1, further comprising a spring plate in operative engagement with the second spring end.

3. The valve as defined in claim 1 wherein the valve body includes an upper annular ring in operative engagement with the cylindrical bore of the pole piece in a manner configured to adjust the spring member and calibrate the valve.

4. The valve as defined in claim 3 wherein the upper annular ring is press-fit within the cylindrical bore of the pole piece.

5. The valve as defined in claim 1 wherein the coil is configured to energize the armature so that the armature is displaced within the bobbin bore and engages the pole piece.

6. The valve as defined in claim 5, further comprising a spring plate in operative engagement with the second spring end, and wherein the armature, the armature point region and the spring plate are configured to exert a force on the spring member and the spool to displace the spool from a first position to a second position within the valve body.

7. The valve as defined in claim 6 wherein a transient position of the spool, intermediate the first position and the second position, is a position at which an opening between the spool and a control port reaches a maximum predetermined height at which fluid flow between a supply port and the control port is unblocked.

8. The valve as defined in claim 7 wherein the opening at the control port is greater than an opening at the supply port.

9. The valve as defined in claim 1 wherein the housing is formed from steel.

10. The valve as defined in claim 1 wherein the armature is formed from steel.

11. The valve as defined in claim 1 wherein the bobbin is formed from a polymeric material.

12. A solenoid valve for distributing fluids, the valve comprising:
- a housing;
- a bobbin disposed within the housing, the bobbin having a bobbin wall defining a bore at a first surface thereof;
- a coil operatively disposed on a second surface of the bobbin wall, the second surface being opposed to the first surface;
- an armature disposed within the bobbin bore, the armature having a point region and a main body, the armature being moveable from a first position to a second position;
- a pole piece including a cylindrical bore, wherein at least a portion of the pole piece is disposed within the housing and proximate to an end of the bobbin;
- a valve body disposed within the cylindrical bore of the pole piece, the valve body having a valve body bore;
- a spool disposed within the valve body bore, the spool having a spool bore, an annular exhaust cavity, and an annular supply-control cavity, the spool being moveable between a first position and a second position in the valve body bore; and
- a spring member having a first spring end operatively disposed within the spool bore.

13. The valve as defined in claim 12, further comprising a spring plate adapted to receive an end of the armature, wherein the spring member includes a second spring end opposed to the first spring end, and wherein the second spring end is operatively proximate to the spring plate.

14. The valve as defined in claim 12 wherein the coil is configured to energize the armature such that the armature is displaced within the bobbin bore, and the armature engages the pole piece.

15. The valve as defined in claim 12 wherein the pole piece is formed from steel.

16. The valve as defined in claim 13 wherein the spring plate is formed from steel.

* * * * *

UNITED STATES PATENT AND TRADEMARK OFFICE
CERTIFICATE OF CORRECTION

| | | |
|---|---|---|
| PATENT NO. | : 8,042,789 B2 | Page 1 of 1 |
| APPLICATION NO. | : 12/245990 | |
| DATED | : October 25, 2011 | |
| INVENTOR(S) | : Robert A. Dayton and Anthony J. Mattord | |

It is certified that error appears in the above-identified patent and that said Letters Patent is hereby corrected as shown below:

In Fig. 5 on drawing sheet 3/3 at box 164, delete "spool cavity" and insert -- spool bore --, therefor.

Signed and Sealed this
Tenth Day of April, 2012

David J. Kappos
*Director of the United States Patent and Trademark Office*